US008723655B2

(12) United States Patent  (10) Patent No.: US 8,723,655 B2
Maier  (45) Date of Patent: May 13, 2014

(54) REMOTE CONTROL AND METHOD FOR THE REMOTE CONTROL OF MULTIMEDIA APPLIANCES

(75) Inventor: Ferdinand Maier, Obertum am See (AT)

(73) Assignee: FM Marketing GmbH (AT)

( * ) Notice: Subject to any disclaimer, the term of this patent is extended or adjusted under 35 U.S.C. 154(b) by 430 days.

(21) Appl. No.: 13/057,354

(22) PCT Filed: Aug. 12, 2009

(86) PCT No.: PCT/EP2009/005852
§ 371 (c)(1),
(2), (4) Date: Feb. 3, 2011

(87) PCT Pub. No.: WO2010/017975
PCT Pub. Date: Feb. 18, 2010

(65) Prior Publication Data
US 2011/0140867 A1  Jun. 16, 2011

(30) Foreign Application Priority Data

Aug. 14, 2008 (DE) .......................... 10 2008 037 750

(51) Int. Cl.
*G05B 11/01* (2006.01)
*G08C 19/12* (2006.01)
*H04L 17/02* (2006.01)
*H04N 5/45* (2011.01)

(52) U.S. Cl.
USPC ............... 340/12.22; 340/12.3; 340/13.21; 340/4.42; 341/173; 341/174; 341/175; 341/176; 348/734; 348/564; 348/569; 700/17; 700/65; 700/83

(58) Field of Classification Search
CPC ........ G01C 21/00; G01C 21/26; G01C 21/36; G06F 3/03; G06F 3/033; G06F 3/041; G06F 3/048; B60R 16/02; G08C 17/00; G08C 17/02; G08G 1/0969
USPC .............. 340/12.2, 4.42, 12.23, 12.24, 12.29, 340/12.3, 12.22, 12.54, 13.2, 13.21, 13.24, 340/13.31; 345/169, 163, 173, 180, 182, 345/184, 1, 2, 327, 328, 326, 864, 716, 717, 345/718; 348/734, 564, 569, 906; 700/17, 700/65, 83; 341/173–176
See application file for complete search history.

(56) References Cited

U.S. PATENT DOCUMENTS 7,145,554 B2  12/2006  Bachmann
7,760,188 B2 *  7/2010  Yoshio et al. ................. 345/173
(Continued)

FOREIGN PATENT DOCUMENTS

RU  2323838  5/2008

OTHER PUBLICATIONS

Written Opinion, PCT/EP2009/005852, dated Feb. 18, 2010, 7 pages.
(Continued)

Primary Examiner — Daniel Wu
Assistant Examiner — Mancil Littlejohn
(74) Attorney, Agent, or Firm — Senniger Powers LLP

(57) ABSTRACT

A remote control having a touch-sensitive control panel and a transmission unit for transmitting encoded signals which are produced on the basis of a direction of movement of contact with successive regions of the control panel, regardless of the location at which contact is made with the control panel. It is also possible to produce encoded signals on the basis of a movement by the remote control in combination with a motion sensor.

21 Claims, 4 Drawing Sheets

(56) References Cited

U.S. PATENT DOCUMENTS

| | | | |
|---|---|---|---|
| 7,760,190 B2 * | 7/2010 | Yeh | 345/173 |
| 7,956,847 B2 * | 6/2011 | Christie | 345/173 |
| 2003/0117377 A1 | 6/2003 | Horie et al. | |
| 2006/0045107 A1 * | 3/2006 | Kucenas et al. | 370/401 |
| 2007/0159362 A1 | 7/2007 | Shen | |
| 2008/0088602 A1 * | 4/2008 | Hotelling | 345/173 |
| 2008/0098331 A1 | 4/2008 | Novick et al. | |

OTHER PUBLICATIONS

Abstract of RU2323838; May 10, 2008.

International Search Report, PCT/EP2009/005852, dated Feb. 18, 2010, 12 pages.

* cited by examiner

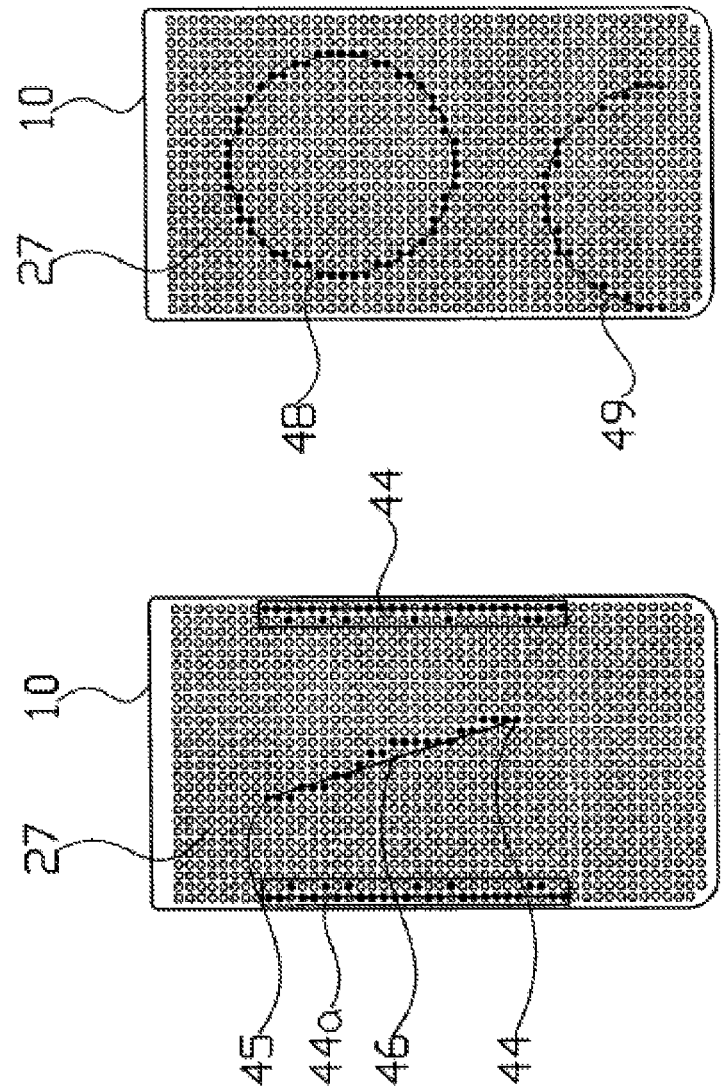

REMOTE CONTROL AND METHOD FOR THE REMOTE CONTROL OF MULTIMEDIA APPLIANCES

REFERENCE TO RELATED APPLICATIONS

This application is a US national application of PCT/EP2009/005852 and claims priority to German application 102008037750.3 filed Aug. 14, 2008.

FIELD OF THE INVENTION

The invention relates to a remote control according to the preamble of patent claim 1, as well as a method for remote control according to the preamble of patent claim 6.

BACKGROUND OF THE INVENTION

Such a remote control is known from DE 196 53 840 A1. There, a handheld transmitter for a remotely activated central locking system in motor vehicles is shown, having a housing, a transmitting means, an electronic control circuit for controlling the transmitting means, and a solar cell, which supplies electrical energy to the control circuit.

GB 2 396 046 A shows an alarm-code trailer with a housing of transparent plastic, inside which is arranged an incandescent bulb, which begins to shine in case of an alarm. Furthermore, two pushbutton switches are provided on the housing for activating and deactivating the alarm.

US 2003/0206128 A1 shows a universal remote control with a transparent acrylic housing, inside which is arranged an incandescent bulb. The bulb can be lit and an acoustical transmitter activated by a locator device.

DE 20 2005 015 165 U1 shows a remote controlled locking device for a motor vehicle, in which a keypad and a display of a touch screen are formed.

Remote controls for the control of electronic appliances, such as television sets, radios, video recorders, satellite receivers, DVD players, but also other household appliances such as lighting fixtures, roll-down shutters, garage doors and the like, are quite common today. They usually have a housing with battery compartment, a printed circuit board with electronic components, a keypad and a transmitting unit, such as an infrared transmitting diode. One of the pushbuttons is normally used for switching the remote control on and off. The other pushbuttons are each assigned one or more functions, so that when the button is pressed an encoded infrared signal is sent out to the appliance being controlled.

The problem with such remote controls is the large and unmanageable number of pushbuttons. Many remote controls have more than 40 buttons, whose functions the majority of users cannot take note of.

EP 1 185 922 B1 therefore proposes, to simplify the use of a multimedia system, a scrolled cross point navigation on a user interface, which requires a remote control with only a few buttons, by which all available functions can be called up on a monitor screen, such as a television receiver.

Instead of a keypad with individual mechanically activated pushbuttons, it has also been proposed to use a touch-sensitive keypad, generally known as a touch pad (see DE 199 08 406 A1, DE 100 13 444 A1, EP 0 813 743 B1) or also a so-called touch screen, i.e., a display device that is touch-sensitive at the same time (see U.S. Pat. No. 5,237,327, U.S. Pat. No. 5,353,016 or EP 0 946 918 B1).

Touch pads and touch screens are generally familiar and described, e.g., in WO 92/04724 A1 or DE 20 2007 001 624 U1. They work by various principles, including capacitive, resistive, optical or with sound waves (surface acoustic waves). These devices, subsumed as "touch-sensitive keypads" or "touch-sensitive control surfaces", produce an electrical signal, which is generally coordinated distinctly with one or more places on their surface, which is touched by an object or a finger.

It is thus possible to replace the functions of a keypad with individual mechanical buttons by a touch-sensitive keypad by assigning definite functions to definite regions of the keypad.

In the aforementioned WO 92/04724, DE 199 08 406 A1, DE 100 13 444 A1 and U.S. Pat. No. 5,353,016, the keypad is transparent and consists, e.g., of a transparent glass plate.

The problem here, nonetheless, is that the user has to touch certain precisely predetermined areas in order to operate the remote control, which generally requires the user to look at the touch screen in order to touch the correct physical location for the desired function. This is difficult in darkened rooms, such as when watching television or showing a movie. There are also difficulties for persons with impaired vision, for example, if they are "far-sighted" (presbyopia) and require glasses for close-range vision, but not for the far range where the monitor screen is located.

SUMMARY OF THE INVENTION

The problem of the invention is therefore to improve the remote control of the aforementioned kind so that it can be operated perfectly without visual contact.

This problem is solved by the features indicated in patent claim 1. Advantageous embodiments and modifications of the invention are found in the subclaims.

The basic principle of the invention is based on evaluating the direction of movement of the touching of the touch-sensitive control surface and then determining the correspondingly encoded signals of the remote control. Thus, this occurs independently of the precise place of touching the control surface. In other words, the user only needs to perform a movement "somewhere" on the control surface by moving his finger or some other object across the control surface, whereupon corresponding control signals are then generated depending on the direction of movement, and not the location.

Often only four control commands are enough for a menu-controlled user operation, namely, the commands "UP", "DOWN", "LEFT" and "RIGHT". These four control commands and the associated encoded signals are assigned predetermined directions of movement within predetermined regions. Thus, for four commands, it is enough to define four quadrants of a circle. For example, if one defines the vertical axis in a Cartesian coordinate system with the angle 0°, a first quadrant defined by the angles −45° to +45° would define a vertical direction V+. A quadrant with the angles 180°+/−45° would define a vertical direction V−. The other two quadrants in the region +/−90°+/−45° would define horizontal directions H+ and H−.

Thus, to call up a function assigned to the direction V+, the user need only move along the keypad somewhere in the direction lying in the first quadrant (−45° to +45°).

Of course, it is also possible to define more than four directions of movement, for example, by making the aforementioned regions more narrow and defining, say, eight segments, each with an angle range of 45°, so that one gets another four diagonal directions of movement and, thus, four additional commands.

One can also produce predetermined signals by rapid back and forth movements in the same direction and also by short onetime or repeated touching of the same spot on the control surface, yet situated anywhere in space.

For personalization of the particular user, an identification device can also be provided, e.g., in the form of a fingerprint reader, which is arranged either in one region of the touch-sensitive control surface or preferably outside of same on a narrow side surface of the remote control, in which case the user has to swipe his finger, preferably his thumb, along the fingerprint reader to a "reading" of his fingerprint.

In the housing of the remote control, a position or motion sensor can also be arranged. In the case of a position sensor, a predetermined signal can be sent out to one or more remotely controlled appliances depending on the position of the remote control. It is especially preferable for the position sensor to send out a shutoff signal for the remotely controlled appliance, such as a television set, in one position of the remote control where the touch-sensitive control surface is pointing downward (toward the center of the earth). This signal, for example, places the remotely controlled appliance in a "standby" mode. On the other hand, when the remote control is turned over to a position where the touch-sensitive control surface is pointing upward, a turn-on signal is sent to one or more remotely controlled appliances, by which they are switched from "standby" mode to active mode.

These signals can also be sent out when the remote control is placed on any of its edges, i.e., when the plane of the touch-sensitive control surface is pointing vertically.

In addition, a motion sensor can also assign a definite encoded signal to predetermined movements, which is sent out automatically when the predetermined movement is executed. For example, the command for a select function can be connected to a predetermined movement of the remote control. The select function in this sense means the activation of a particular function displayed on a monitor screen. Here, once again, a predetermined signal to be sent is assigned in the remote control.

Moreover, the remote control itself can be switched to a power-saving mode if no movement or change of position and no touching of the touch-sensitive control surface has occurred for a particular length of time. On the other hand, the remote control can be switched from the power-saving mode to an active operating mode when the remote control itself is moved or changes position, or when the touch-sensitive control surface is touched.

Preferably, the touch-sensitive control surface entirely occupies a surface of the remote control.

According to one modification of the invention, in a bidirectional operation of the remote control with an appliance being controlled, other movements with more complex motion patterns can also be activated, whereupon linear movements of touching successive regions of the control surface are deactivated. Here, for example, a circular movement with a full circle, a semicircle, a quarter circle, or also more complex movements like a plus sign, letters or numbers, are possible, and these motion patterns are also absolutely independent of the place of touching of the control surface. The simple function involving merely a single direction of movement and being independent of the length of the direction of movement must be deactivated, or else a more complex pattern with several different consecutive directions of movement would produce a plurality of commands. The switching to this modified operating mode preferably occurs as a function of a menu system of the remotely controlled appliance, resulting in a bidirectional operation between the remotely controlled appliance and the remote control. The remote control thus receives a corresponding switching signal from the remotely controlled appliance for this case.

The touch-sensitive control surface can work by any familiar principle. Preferable is a capacitive sensing of the surface. But pressure-sensitive sensors, ultrasound sensors working by the surface wave principle, heat sensors or optical sensors are also possible.

The power supply of the remote control can come from solar cells, which charge a storage unit, such as a battery or a condenser. When using a battery, there can also be an inductive charging or a charging by galvanic contacts interacting with a charging station.

BRIEF DESCRIPTION OF THE FIGURES

Further details of the invention will emerge from the following description of a sample embodiment in connection with the drawing, which shows:

FIG. 6 [and 7] a schematic top view of the control surface used in the invention.

DETAILED DESCRIPTION OF PREFERRED EMBODIMENTS

Figure 1:
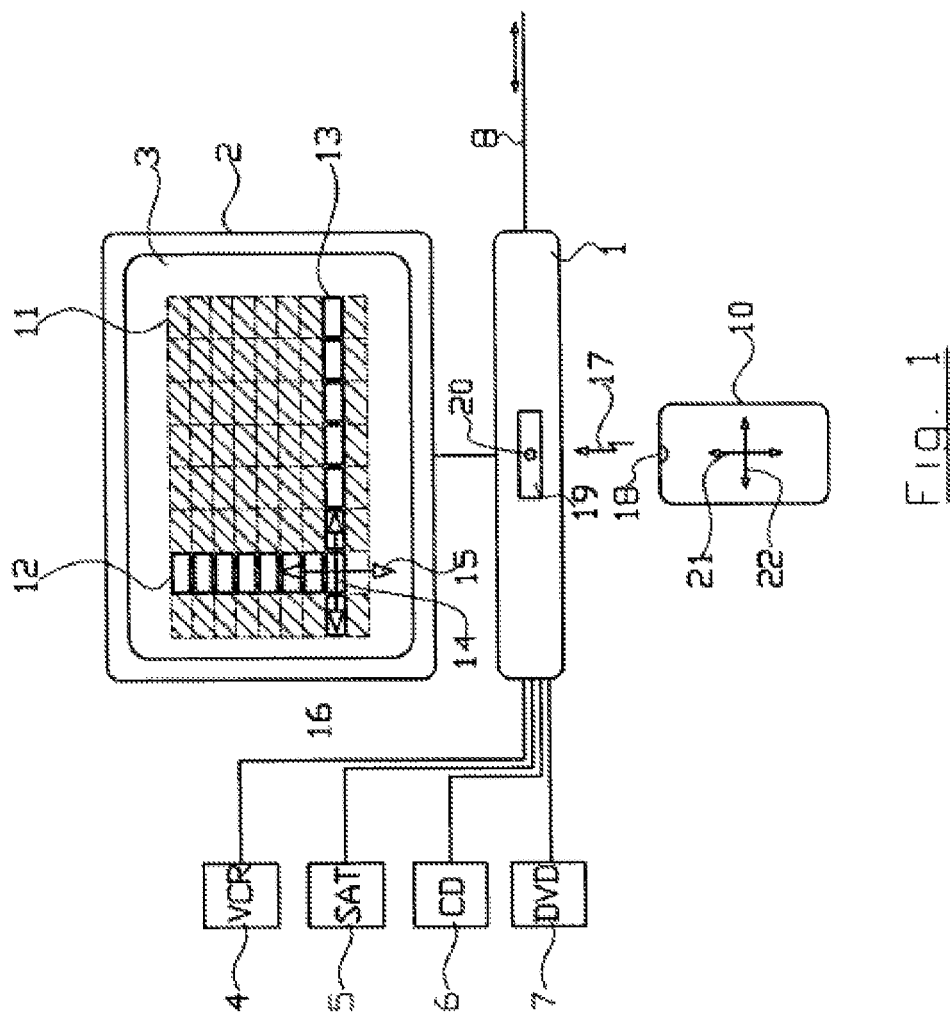
FIG. 1 a basic diagram of a multimedia system with a remote control according to the invention.

FIG. 1 shows a multimedia system with a central control unit 1, to which a television set 2 with a monitor screen 3 is connected, as well as a plurality of other multimedia appliances 4, 5, 6, and 7, such as a video recorder 4, a satellite receiver 5, a CD player 6, a DVD player 7, while generally any given controllable electrical appliances can be hooked up, such as door openers, lighting controls, alarm systems, door locking systems, heating systems, video cameras, other household appliances, etc. Finally, the central control unit can also have other communication connections 8, such as a connection to the Internet, a telephone network, or other communication networks.

All appliances hooked up to the central control unit can be controlled from a remote control 10 in concert with the central control unit 1, which is done, for example by a menu system, which is displayed on the monitor screen 3. The menu system is organized in principle in the form of a matrix 11, having a plurality of columns 12 and a plurality of rows 13. Each field of the matrix is coordinated with an individual control command for one of the connected appliances. Each field of the matrix can be actuated via the remote control 10, which preferably occurs in that the entire matrix 11 is moved by horizontal and/or vertical shifting so that a selected field is shifted into a focus region 14, which is located permanently at a predetermined site of the monitor screen 3. This menu system becomes especially clear when only one column 12 and one row 13 are visible and all other fields of the matrix are masked, as shown in FIG. 1 by hatching. The focus region 14 is then situated at the intersection of the visible column 12 and the visible row 13.

As indicated by a vertical arrow 15 and a horizontal arrow 16, the entire matrix can thus be "scrolled" vertically and horizontally, and only one field is always found in the focus region 14. In this way, one can realize a selection of a particular field and, thus, a particular command by four movement commands, namely, the commands "UP", "DOWN", "LEFT" and "RIGHT". If the desired field with the corresponding function for the particular appliance is in the focus region 14, one only needs now a selection or activation command. Furthermore, it is advisable to also provide a "RETURN" command to go "backward" through various menu levels if need be.

With such a menu system, one only needs in theory six control commands, but of course additional commands can also be provided for special applications.

At least these mentioned six control commands and also any other additional control commands are generated by the keyless remote control 10 and relayed as encoded signals to the central control unit 1, which is preferably done wireless with encoded infrared signals, as indicated by arrow 17.

The remote control 10 accordingly has a transmitting unit 18 with a transmitting diode and the central control unit 1 has a corresponding receiving unit 19 with a receiving diode 20. In theory, a bidirectional communication can also be provided between the central control unit 1 and the remote control 10, to relay feedback messages from the control unit 1 to the remote control 10 or to carry out an "update" of the software of the remote control 10.

For the aforementioned commands for shifting the matrix in accordance with the arrows 15 and 16 and also for other control commands, the remote control 10 is designed so that these commands are called up merely by moving a finger or another object across a touch-sensitive control surface of the remote control 10 and not, as in the prior art, by touching fixed predefined regions of the switch surface. Similar to the direction of the arrows 15 and 16, corresponding movements are to be performed on the control surface of the remote control 10, as indicated by the arrows 21 and 22.

Figure 2:
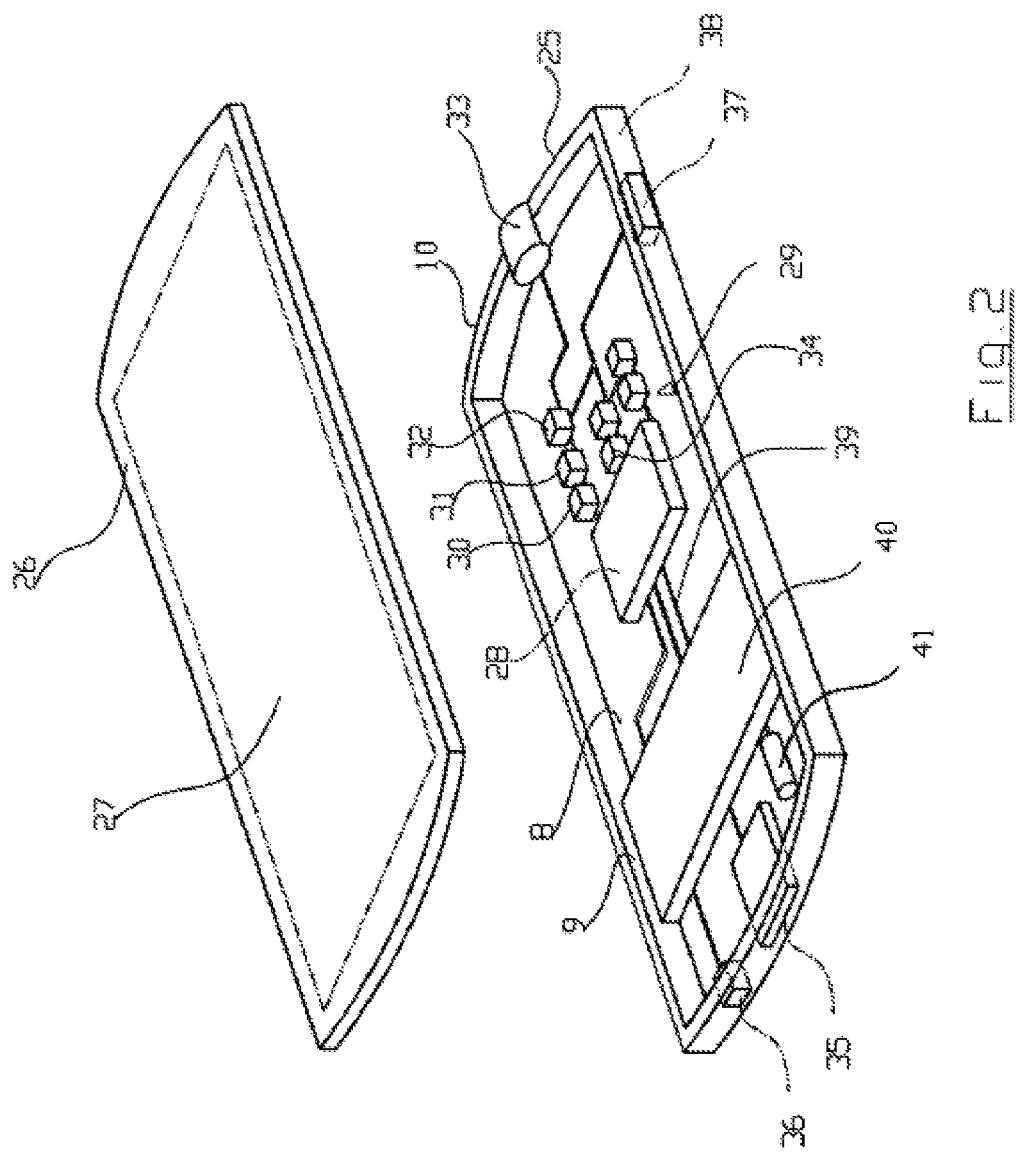
FIG. 2 a schematic exploded diagram of a sample embodiment of a remote control according to the invention.

FIG. 2 shows the remote control 10 in an exploded representation. The remote control 10 has a housing 25 and a housing cover 26, whose outside is provided almost entirely with a touch-sensitive control surface 27, while the cover 26 and the control surface 27 are transparent. For example, the cover 26 consists of glass or a transparent plastic, such as acrylic glass. In the assembled state, the cover 26 is firmly and at least water spray-resistant connected to the housing 25. The housing 25 can also be of glass or other transparent material. But it is also possible to make the housing from any other materials, especially plastics. All required components except for the control surface 27 are arranged inside the housing. Thus, the inside of the housing contains a microprocessor 28 as well as other electronic components 29, one of which is a position sensor 30. Another component can be a motion sensor 31. Another component is a driver circuit 32 to actuate an infrared transmitting diode 33, which can also be configured as a receiving diode in addition, and then the driver circuit 32 can also take on the function of a receiving unit. Moreover, the components contain at least one memory module 34, which can also be integrated in the microprocessor 28. Optionally, another memory module 35 is provided in the form of a so-called SIM card 35.

Optionally, an external interface 36 can be provided, for example, in the form of a familiar USB port (USB=Universal Serial Bus).

Moreover, an identification device 37 is provided, which is a fingerprint reader, for example, being arranged here so that it points toward a narrow side 38 of the housing 25 and is thus separate from the control surface 27. But it is also possible to arrange such a fingerprint reader in the control surface 27. All components mentioned thus far are directly or indirectly connected by lines 39 to the microprocessor 28.

The power supply of the remote control 10 can come from a battery 40, which is inductively charged by a coil 41. Alternatively, the battery 40 can also be charged by the USB port 36. Finally, it is also possible to place solar cells on the underside of the housing 25, away from the control surface 27, by which the battery 40 is charged.

The entire remote control 10 has no buttons or mechanically activated external switches. Instead, it is activated solely by its position in conjunction with the position sensor 30 and possibly by certain movements in conjunction with the motion sensor 31 and also by the touch-sensitive control surface 27. Thus, the remote control has a largely smooth housing, which not only creates a pleasing design, but also hinders the danger of penetration of dirt or moisture, and it is not subject to any danger of moving parts, such as switches, pushbuttons, etc., becoming mechanically damaged.

The basic operation of the remote control occurs by moving a finger or other object over the control surface 27.

Figure 3:
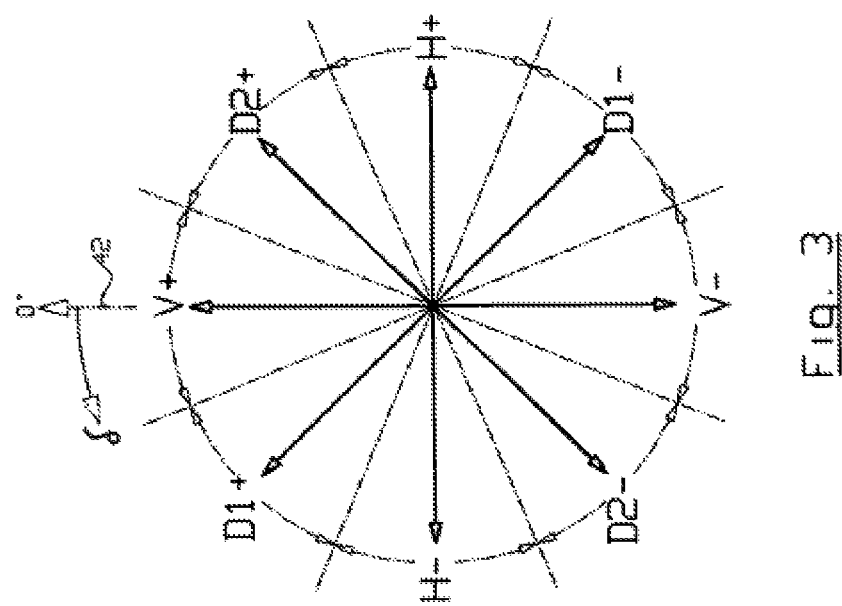
FIG. 3 a basic diagram to explain directions of movement.

FIG. 3 will illustrate this. In the diagram depicted there, eight directions of movement are defined, namely:

Vertical "UP" (V+),
Vertical "DOWN" (V−),
Horizontal "RIGHT" (H+),
Horizontal "LEFT" (H−),
Diagonal "LEFT UP" (D1+)
Diagonal "RIGHT DOWN" (D1−),
Diagonal "RIGHT UP" (D2+), and
Diagonal "LEFT DOWN" (D2−).

Each of these eight directions of movement is coordinated with a sector having an angle range of 22.5°. This means that a movement across the control surface 27 in a direction δ is investigated and assessed in terms of which of the sectors defined in FIG. 3 it falls under. In mathematical terms, a vector is formed and its direction or angle δ is determined in relation to an axis, such as the longitudinal axis 42.

It is important that this occurs entirely regardless of the point on the control surface 27 where the movement is done, since only the direction or the angle position δ of the vector is what matters.

Figure 4:
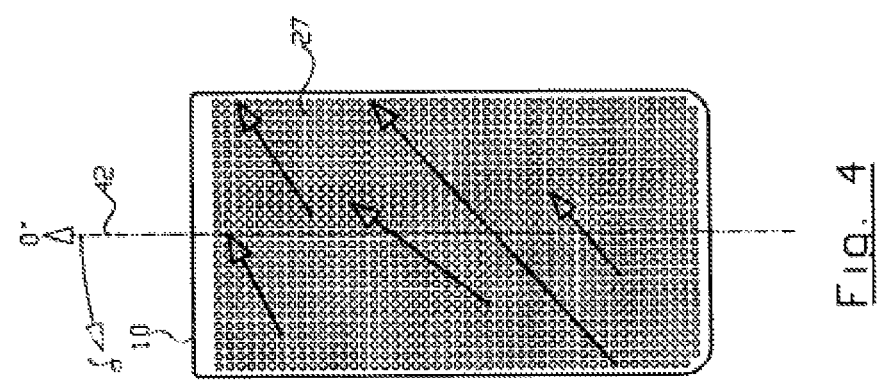
FIG. 4 [and 5] a schematic top view of a touch-sensitive control panel to explain control options.

This is explained in connection with FIGS. 4 and 5. In FIG. 4, various touch-sensitive elements are represented in the form of circles. If one moves his finger anywhere on the control surface 27 over these elements, individual regions (circles) will be touched one after the other in time, being represented in FIG. 6 as black, dark points. From these, a vector can be formed, corresponding to the arrows shown in FIGS. 4 and 5, subtending an angle δ relative to the principal axis 42.

All arrows shown in FIG. 4 have an angle δ relative to a principal direction, corresponding to a longitudinal axis 42, that falls within the sector designated D2+ in FIG. 3.

Figure 5:
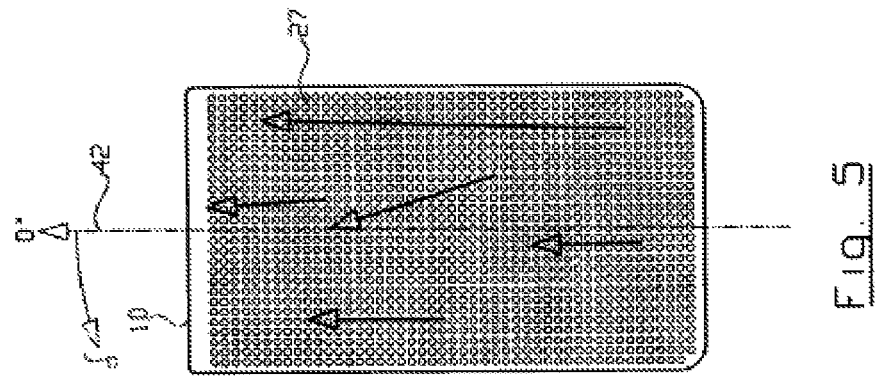

In similar fashion, all arrows shown in FIG. 5 have an angle δ that falls within the sector designated V+ in FIG. 3. Each time that an angle δ coordinated with one of the arrows is recognized in one of the sectors, a coordinated encoded command is sent out as an infrared signal. The length of the arrows in FIGS. 4 and 5 is of lesser importance. For a clear identification of a movement, only a certain minimum length is predefined, for example, in order to distinguish between a movement and a repeated touching (so-called double click) of more or less the same location.

For many applications, it is sufficient to provide only four movement commands, corresponding to V+, V−, H+, H−. In this case, the individual sectors can be broader, i.e., for example, +/−45° to each principal direction.

FIG. 6 shows, in a top view of the touch-sensitive switching surface, a series of dark points in the center region that are touched in succession. Generally, one can already form a vector 46 from the starting and end point 44 and 45 and evaluate it. However, the certainty of identification is heightened by taking into account also the other points traveled with a mathematical method and forming the vector 46 from this.

At the right of FIG. 6 is shown a special region 44, which can be reserved for special functions. For example, it is desirable in the remote control of television sets to be able to select the special function "loud" and "quiet" for the sound without calling up the menu controls, wherein a movement upward in this special region 44 increases the loudness and a downward movement decreases it. For other very often used special functions, such as channel changing of television sets, other special regions can be provided, being advisedly arranged near the edge of the control surface 27, such as a special region 44*a* in FIG. 6, which is reserved for the function "RETURN", by which the user can go back one menu level.

FIG. 7 shows that other movements are also possible to trigger predefined commands, such as the movement in the form of a full circle 48 or a semicircle 49, while here again the direction of rotation (clockwise or counterclockwise) can be taken into account. In practice, of course, one will stay with simple geometrical figures, in order to keep the operation simple, but more complex patterns are also possible, such as letters, numbers, or other symbols. Thus, encoded signals will be generated by the transmitting unit in dependence on several successive directions of movement of the touching of successive regions of the control surface, and this again is absolutely independent of the particular place of the touching. In order to distinguish linear movements with only a single direction of movement (as shown in FIG. 6), for the recognition of more complex patterns (as shown in FIG. 7) the remote control must be switched to a different operating mode, which is preferably done by the central control unit 1 (FIG. 1), and then a bidirectional operation between the control unit 1 and the remote control 10 will occur. In this operating mode, which is activated in dependence on a menu system of the control unit, movements with only a single direction of movement are ignored, or else a starting movement along a more complex pattern would generate a vector with one direction of movement.

Another important special function for practical use that one primarily reserves for the select function is when a region is only briefly tapped once or twice, without performing a movement along a longer path. Here again it is entirely irrelevant which spot on the control surface is touched in this way, so that the user does not have to touch a precisely predefined region, as is the case with a so-called touch screen.

To simplify the operation further, the control surface 27 can also be outfitted with a visual display. Acoustic sounds can also be generated in dependence on particular signals emitted (17 in FIG. 1), in order to give the user an acoustic confirmation.

As mentioned in the beginning, certain movements can be detected by the motion sensor 31 (FIG. 1) and transformed into corresponding encoded control signals when predetermined threshold values are reached. The control commands triggered by movements can also be used to select different appliances for control and thus corresponding menus. It is also of special importance that remotely controlled appliances can be switched on and off by the motion sensor 31 or the position sensor 30.

It is also possible, when using a "touch screen", to depict the respective menu or matrix 11 of FIG. 1 on the touch-sensitive control surface 27.

What is claimed is:
1. Remote control with a touch-sensitive control surface and with a transmitting unit for the sending of encoded signals in dependence on a touching of the control surface, wherein:

the transmitting unit generates the encoded signals in dependence on the direction of movement of the touching of successive regions of the control surface; and the transmitting unit generates the encoded signals in dependence on several different successive directions of movement of the touching of successive regions of the control surface regardless of the place of touching of the control surface, wherein the remote control is switched by bidirectional operation in concert with a control unit to an operating mode in which a touching of successive regions of the control surface in only one direction of movement is ignored;

wherein the bidirectional operation comprises communication which relays feedback messages from the control unit to the remote control.

2. Remote control according to claim 1 wherein the remote control has a motion sensor and/or a position sensor and the remote control generates predetermined encoded signals in dependence on output signals of the position sensor and/or the motion sensor.

3. Remote control according to claim 2 wherein one of said predetermined encoded signals is a signal for switching off one or more remotely controlled appliances.

4. Remote control according to claim 2 characterized in that the remote control in one position where the control surface is vertically oriented or points downward in the direction of the center of the earth generates a predetermined encoded signal for switching off one or more remotely controlled appliances.

5. Remote control according to claim 1 wherein the remote control has an identification device and the encoded signals are additionally generated in dependence on an output signal of the identification device.

6. Remote control according to claim 2 wherein the transmitting unit generates the encoded signals in dependence on several different successive directions of movement of the touching of successive regions of the control surface regardless of the place of touching of the control surface, wherein the remote control is switched by bidirectional operation in concert with a control unit to an operating mode in which a touching of successive regions of the control surface in only one direction of movement is ignored.

7. Remote control according to claim 2 wherein the remote control has an identification device and the encoded signals are additionally generated in dependence on an output signal of the identification device.

8. Remote control according to claim 3 wherein the transmitting unit generates the encoded signals in dependence on several different successive directions of movement of the touching of successive regions of the control surface regardless of the place of touching of the control surface, wherein the remote control is switched by bidirectional operation in concert with a control unit to an operating mode in which a touching of successive regions of the control surface in only one direction of movement is ignored.

9. Remote control according to claim 3 wherein the remote control has an identification device and the encoded signals are additionally generated in dependence on an output signal of the identification device.

10. The remote control of claim 1 wherein said several different successive directions of movement of the touching of successive regions of the control surface comprise a circular movement.

11. The remote control of claim 1 wherein said several different successive directions of movement of the touching of successive regions of the control surface comprise a full circle, semicircle, or quarter circle movement.

12. The remote control of claim 1 wherein said several different successive directions of movement of the touching of successive regions of the control surface comprise a plus sign, letters, or numbers.

13. The remote control of claim 1 wherein the control unit is connected to a television set.

14. The remote control of claim 1 wherein the control unit is connected to a plurality of multimedia appliances.

15. The remote control of claim 1 wherein the control unit is connected to controllable electrical appliances selected from the group consisting of door openers, lighting controls, alarm systems, door locking systems, heating systems, and video cameras.

16. Method for the remote control of multimedia systems, wherein by touching a touch-sensitive control surface, predetermined encoded signals are sent out;
wherein a direction of movement of the touching of successive regions of the control surface is ascertained and the predetermined encoded signals are selected in dependence on the direction of movement regardless of the place of touching of the control surface;
wherein several successive directions of movement of the touching of successive regions of the control surface are ascertained and the predetermined encoded signals are selected in dependence on the several detected directions of movement regardless of the place of touching of the control surface, wherein a touching with only a single direction of movement is ignored and wherein the remote control furthermore is switched by a bidirectional operation in concert with a control unit to this operating mode; and
wherein the bidirectional operation comprises communication which relays feedback messages from the control unit to the remote control.

17. Method according to claim 16 wherein it is detected within which sector of angle ranges the direction of movement lies and each sector is assigned a predetermined encoded signal.

18. Method according to claim 17 wherein each sector comprises an angle range of 90°.

19. Method according to claim 17 wherein each sector comprises an angle range of 45°.

20. Method according to claim 16 wherein movements of the remote control are detected by a motion sensor and/or the position of the remote control by a position sensor and predetermined encoded signals are generated in dependence on the output signal of the motion sensor and/or the position sensor.

21. Method according to claim 16 wherein the encoded signals generated in dependence on output signals of the motion sensor and/or the position sensor turn on and/or off one or more remotely controlled appliances.

* * * * *